United States Patent
Chen et al.

(10) Patent No.: US 6,950,597 B2
(45) Date of Patent: Sep. 27, 2005

(54) POLYMER-BASED RARE EARTH-DOPED WAVEGUIDE DEVICE

(75) Inventors: Ga-Lane Chen, Fremont, CA (US); Charles Leu, Fremont, CA (US)

(73) Assignee: Hon Hai Precision Ind. Co., Ltd., Taipei Hsien (TW)

(*) Notice: Subject to any disclaimer, the term of this patent is extended or adjusted under 35 U.S.C. 154(b) by 274 days.

(21) Appl. No.: 10/407,502

(22) Filed: Apr. 3, 2003

(65) Prior Publication Data
US 2004/0091230 A1 May 13, 2004

(30) Foreign Application Priority Data
Nov. 8, 2002 (TW) .................................. 91132847 A

(51) Int. Cl.⁷ .............................. G02B 6/00; G02B 6/36
(52) U.S. Cl. .......................... 385/142; 372/6; 385/147; 501/48
(58) Field of Search .................... 385/140–143, 385/147; 501/48; 359/341, 342, 341.5; 372/6, 40; 252/301.4

(56) References Cited

U.S. PATENT DOCUMENTS

| | | | | |
|---|---|---|---|---|
| 5,581,398 A | * | 12/1996 | van Veggel et al. | 359/342 |
| 5,982,973 A | * | 11/1999 | Yan et al. | 385/141 |
| 6,538,805 B1 | * | 3/2003 | Norwood et al. | 359/341.5 |
| 6,875,561 B2 | * | 4/2005 | Leu et al. | 430/321 |

* cited by examiner

Primary Examiner—Akm Enayet Ullah
(74) Attorney, Agent, or Firm—Wei Te Chung

(57) ABSTRACT

A polymer-based waveguide device is for use in an optical amplifier or as a laser waveguide. The waveguide device includes a substrate (1), a polymer bottom cladding layer (21) on the substrate, a polymer channel waveguide (3) on the bottom cladding layer, and a polymer top cladding layer (22). The channel waveguide is doped with at least one kind of rare earth metal ion that can be excited to produce a laser. The bottom and top cladding layers have a same refractive index, which is substantially lower than a refractive index of the channel waveguide. When a light signal is input to the waveguide device, an amplified light signal is obtained and is transmitted within the channel waveguide.

20 Claims, 3 Drawing Sheets

POLYMER-BASED RARE EARTH-DOPED WAVEGUIDE DEVICE

BACKGROUND OF THE INVENTION

1. Field of the Invention

The present invention relates generally to a rare earth-doped optical amplifier, and particularly to a polymer-based erbium-doped waveguide device for use in an erbium-doped waveguide amplifier (EDWA).

2. Description of Prior Art

Optical amplifiers increase the optical output power of an end-terminal system. They can also be used as repeaters, thus allowing increased distance between end-terminal equipment. Rare earth-doped amplifiers can be stimulated to produce a laser that has the same wavelength as that of incident light. Erbium-doped amplifiers are the most established and accepted rare earth-doped amplifiers.

A type of erbium-doped amplifier called an erbium-doped fiber amplifier (EDFA) is commonly used in transoceanic cable transmission. However, EDFAs are generally too expensive for use in high-density metropolitan area networks (MANs). Erbium-doped waveguide amplifiers (EDWAs) have many of the advantages of EDFAs, are more economical to use in MAN applications, and yield better price/performance ratios than EDFAs in MANs. An EDWA comprises an erbium-doped waveguide embedded in a glass substrate. Its similarity to an EDFA derives from its use of an erbium-doped waveguide as a gain medium.

Referring to FIG. 3, U.S. Pat. No. 5,982,973 discloses an erbium-doped planar optical waveguide comprising a substrate, a bottom layer formed on the substrate, an active guiding layer arranged on the bottom layer, and a top cladding layer arranged over the active guiding layer. The sputtering deposition method is used for creating the active guiding layer and top cladding layer of the waveguide, and the material for the active guiding layer and top cladding layer is glass.

However, a planar waveguide amplifier is not suitable for optical communications because of its high polarization dependence. Furthermore, it produces optical amplification in all directions within a plane, rather than simply in the required linear direction.

Referring to FIG. 4, U.S. Statutory Invention Registration (SIR) H 1,848 discloses a Z-propagating waveguide laser and amplifier device in which a rare earth-doped lithium niobate ($LiNbO_3$) crystal is used as a waveguide substrate. The waveguide is formed in the $LiNbO_3$ crystal substrate, substantially parallel to the crystallographic Z-axis of the $LiNbO_3$ crystal substrate. A metal diffusion method is used to create the graded refractive index of the crystalline waveguide.

Unfortunately, the metal diffusion method of U.S. SIR H 1,848 results in the waveguide laser and amplifier device having a gradual gradient distribution of rare earth ion density. There is no distinct boundary between the waveguide and the substrate. A stepped gradient distribution that matches the dimensions of corresponding input and output fibers cannot be attained.

In addition, the waveguide devices in U.S. Pat. No. 5,982,973 and SIR H 1,848 both take a lot of time to produce, and are relatively expensive. A suitable material is desired to lower the costs of optical amplifiers.

SUMMARY OF THE INVENTION

In view of the above, it is an object of the present invention to provide an inexpensive optical waveguide for easily producing a desired laser.

It is also an object of the present invention to provide an inexpensive waveguide for optical amplifiers used in MAN applications.

It is a further object of the present invention to provide an optical amplifier that has a low signal to noise ratio, low polarization dependence on gain and low crosstalk between Dense Wavelength-Division Multiplexer (DWDM) channels.

In order to achieve the objects mentioned above, a polymer-based waveguide device in accordance with the present invention is for use in an optical amplifier or as a laser waveguide. The waveguide device comprises a substrate, a polymer bottom cladding layer on the substrate, a polymer channel waveguide on the bottom cladding layer, and a polymer top cladding layer. The channel waveguide is doped with at least one kind of rare earth metal ion that can be excited to produce a laser. The bottom and top cladding layers have a same refractive index, which is substantially lower than a refractive index of the channel waveguide. When a light signal is input to the waveguide device, an amplified light signal is obtained and transmitted within the channel waveguide.

Other objects, advantages and novel features of the present invention will become more apparent from the following detailed description when taken in conjunction with the accompanying drawings, in which:

DETAILED DESCRIPTION OF PREFERRED EMBODIMENT OF THE INVENTION

Figure 1:
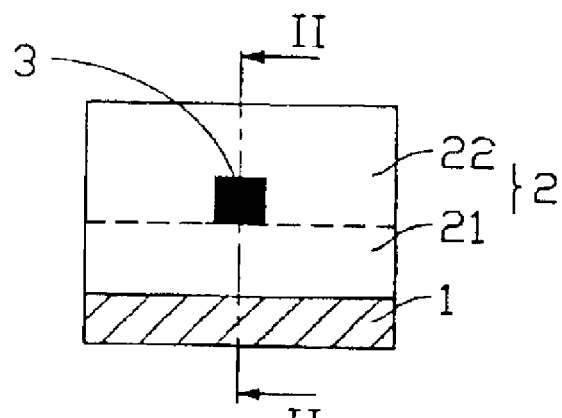
FIG. 1 is a cross-sectional view of a polymer-based rare earth-doped waveguide in accordance with a preferred embodiment of the present invention.
Figure 2:
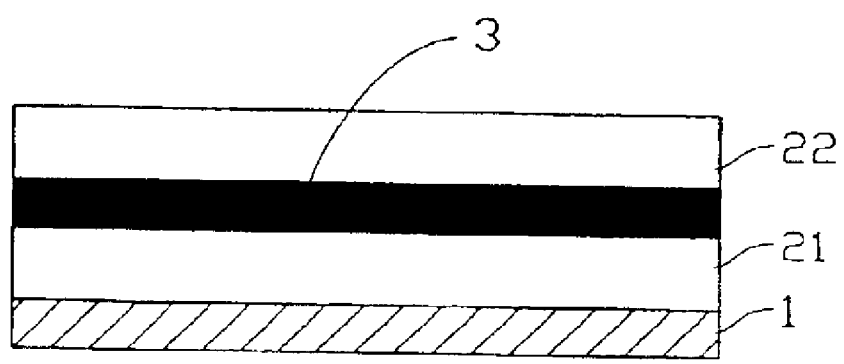
FIG. 2 is a cross-sectional view of FIG. 1, taken along line II—II of FIG. 1.
Figure 3:
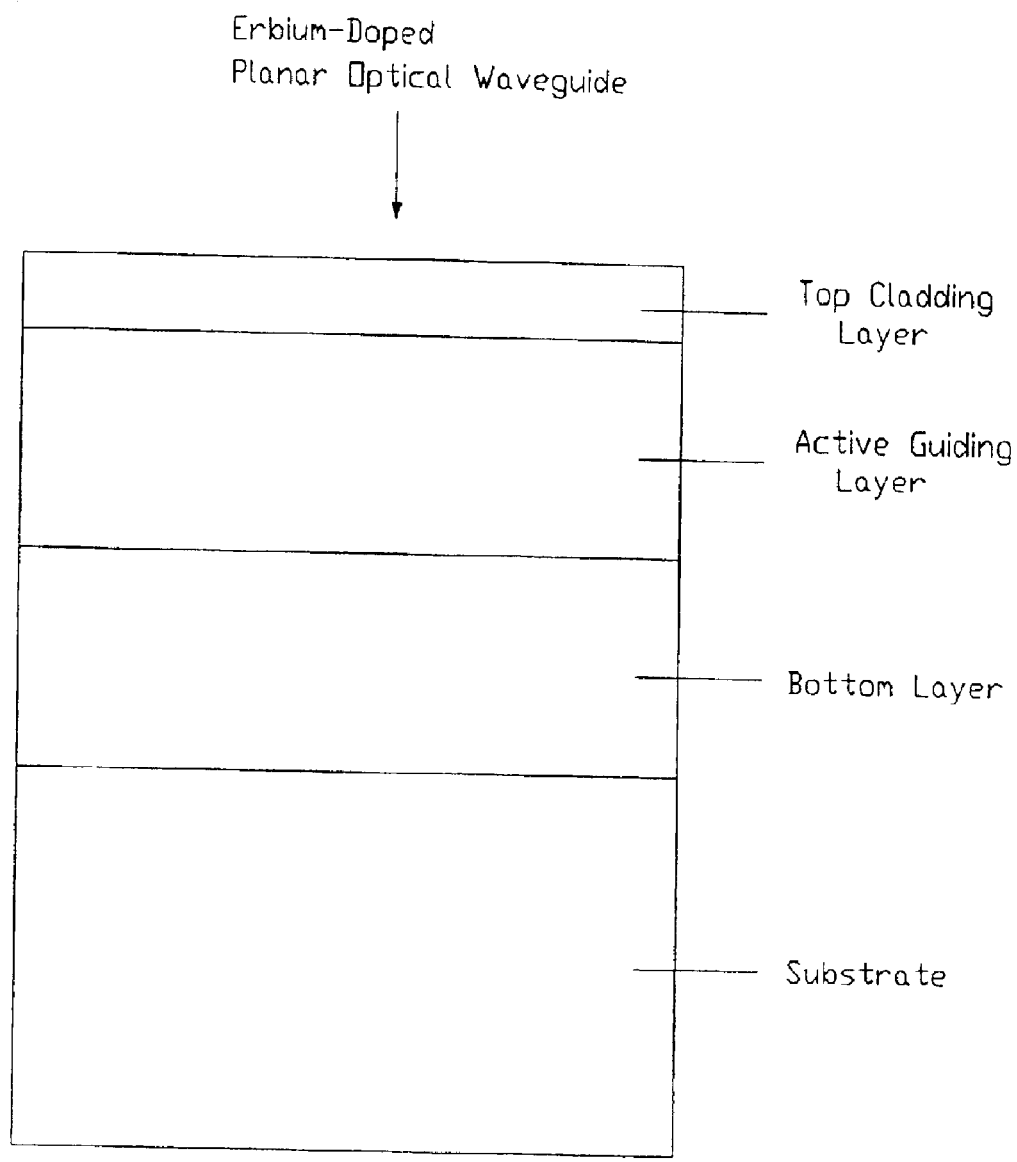
FIG. 3 is a cross-sectional view of a conventional erbium-doped planar optical waveguide device.
Figure 4:
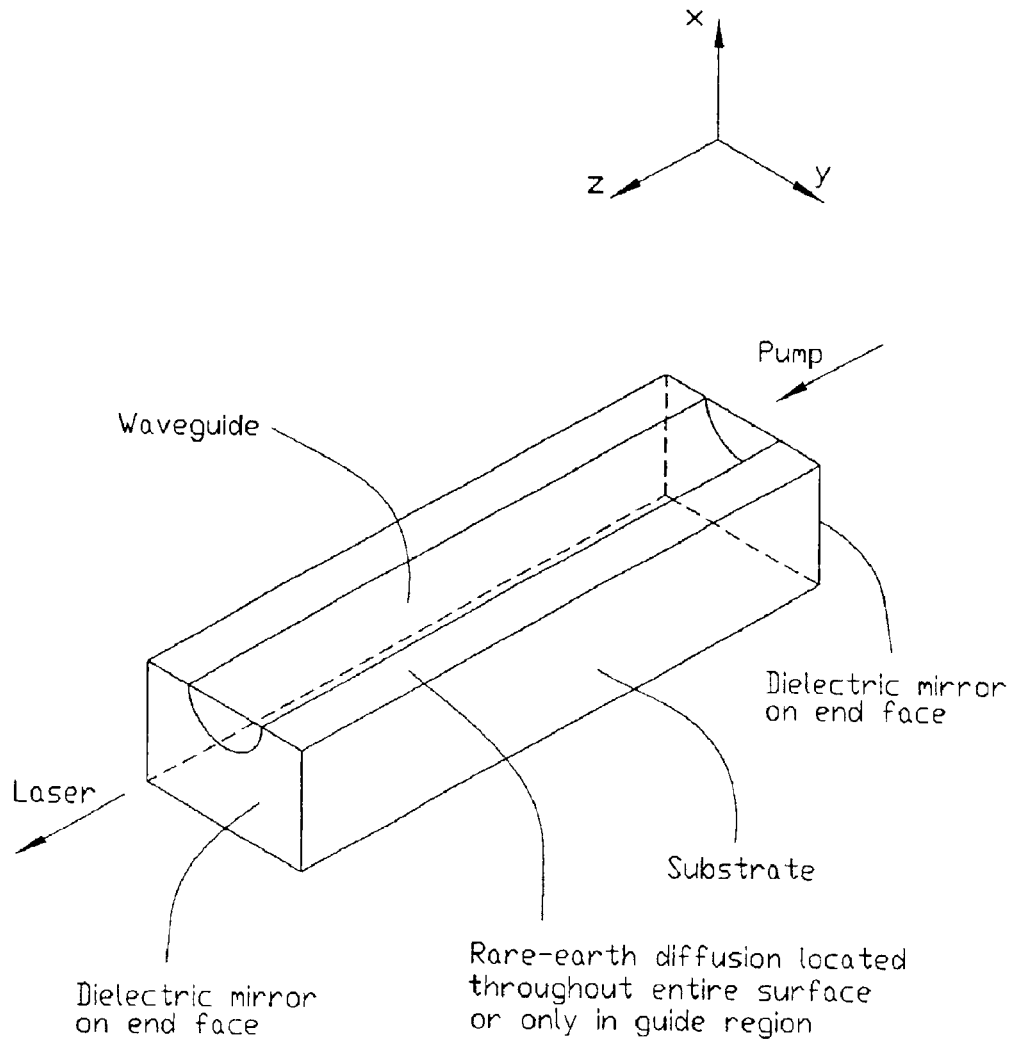
FIG. 4 is a schematic perspective diagram of a conventional Z-propagating waveguide laser and amplifier device.

Referring to FIG. 1, a polymer-based rare earth-doped waveguide device in accordance with the present invention is for use in an optical amplifier or as a laser waveguide. The waveguide device comprises a substrate 1, a polymer bottom cladding layer 21, a channel waveguide 3, and a polymer top cladding layer 22. The bottom cladding layer 21 is arranged on the substrate 1. The channel waveguide 3 is arranged on the bottom cladding layer 21. The top cladding layer 22 covers the channel waveguide 3 and the bottom cladding layer 21. Therefore, the bottom cladding layer 21 and top cladding layer 22 cooperate to comprise a protective overcoat 2 covering the channel waveguide 3. Referring to FIG. 2, the channel waveguide 3 is arranged substantially parallel to the substrate 1.

The substrate 1 is selected from a group comprising silicon single crystal, silicon polycrystal, lithium niobate single crystal, quartz, optical glass and optical plastic.

The channel waveguide 3 is made of a material comprising a first polymer and complexed dopant ions. Each complexed dopant ion is made from a second polymer having a polydentate cage structure which encloses a rare earth metal dopant ion. More than one kind of rare earth metal ion may be used in the channel waveguide 3. The rare earth metal ions used must be capable of being excited to produce a laser. Suitable rare earth metal ions include erbium (Er), thulium (Tm), holmium (Ho), praseodymium (Pr), samarium (Sm), cerium (Ce), ytterbium (Yb), neodymium (Nd), europium (Eu) and gadolinium (Gd). The complexes are dissolved in the first polymer, with solubility of the complexed rare earth metal ions in the first polymer being relatively high.

In the preferred embodiment, the bottom and top cladding layers 21, 22 are made of a same material, and therefore also have a same refractive index. The material of the bottom and top cladding layers 21, 22 has a refractive index substantially lower than a refractive index of the material of the channel waveguide 3, to keep transmitting light signals within the channel waveguide 3. When a light signal is input to the waveguide device, an amplified light signal is obtained and transmitted within the channel waveguide 3.

The waveguide device can be constructed so that a relatively clear physical boundary is obtained between the channel waveguide 3 and the bottom cladding layer 21, and between the channel waveguide 3 and the top cladding layer 22. This construction provides a refractive index step boundary between the channel waveguide 3 and the bottom cladding layer 21, and between the channel waveguide 3 and the top cladding layer 22. The waveguide device can also be constructed so that a relatively unclear or blurred physical boundary is obtained between the channel waveguide 3 and the bottom cladding layer 21, and between the channel waveguide 3 and the top cladding layer 22. This construction provides a substantially continuous refractive index gradient distribution between the channel waveguide 3 and the bottom cladding layer 21, and between the channel waveguide 3 and the top cladding layer 22. The refractive index gradually decreases from within the channel waveguide 3 outwardly through the bottom cladding layer 21, and from within the channel waveguide 3 outwardly through the top cladding layer 22.

It is to be understood that a waveguide device in accordance with the present invention may also comprise a plurality of channel waveguides 3 instead of only one channel waveguide 3. In such case, the channel waveguides 3 can be substantially parallel to each other, and substantially parallel to the substrate 1. A network of channel waveguides 3 substantially parallel to the substrate 1, possibly built on different levels above the substrate 1, is also envisioned.

Other modifications and adaptations of the above-described preferred embodiments of the present invention may be made to meet particular requirements. This disclosure is intended to exemplify the invention without limiting its scope. All modifications that incorporate the invention disclosed in the preferred embodiments are to be construed as coming within the scope of the appended claims or the range of equivalents to which the claims are entitled.

We claim:

1. A polymer-based waveguide device for use in an optical amplifier or as a laser waveguide, the polymer-based waveguide device comprising:
   a substrate;
   a polymer bottom cladding layer arranged on the substrate;
   at least one polymer channel waveguide doped with rare earth metal ions that can be excited to produce a laser, the at least one channel waveguide being arranged on the bottom cladding layer, the rare earth metal ions being combined with an organic compound to form complexes which have relatively high solubility in a polymer; and
   a polymer top cladding layer arranged on the at least one channel waveguide.

2. The polymer-based waveguide device as described in claim 1, wherein the substrate is made of a material selected from a group comprising silicon single crystal, silicon polycrystal lithium niobate single crystal, quartz, optical glass and optical plastic.

3. The polymer-based waveguide device as described in claim 1, wherein the rare earth metal ions are one or more of the group comprising erbium, thulium, holmium, praseodymium, samarium, cerium, ytterbium, neodymium, europium and gadolinium.

4. The polymer-based waveguide device as described in claim 1, wherein the organic compound in the complexes has a polydentate cage structure enclosing the rare earth metal ions.

5. The polymer-based waveguide device as described in claim 1, wherein the bottom and top cladding layers are made of the same polymer.

6. The polymer-based waveguide device as described in claim 1, wherein a refractive index of the bottom cladding layer is substantially lower than a refractive index of the at least one channel waveguide, and a refractive index of the top cladding layer is substantially lower than the refractive index of the at least one channel waveguide.

7. The polymer-based waveguide device as described in claim 6, wherein the refractive index of the bottom cladding layer is substantially equal to the refractive index of the top cladding layer.

8. The polymer-based waveguide device as described in claim 1, wherein the at least one channel waveguide is substantially parallel to the substrate.

9. The polymer-based waveguide device as described in claim 1, wherein the polymer-based waveguide device comprised a plurality of polymer channel waveguides, and the channel waveguides are substantially parallel to each other.

10. The polymer-based waveguide device as described in claim 1, further comprising substantially a refractive index step boundary between the at least one channel waveguide and the bottom cladding layer, and substantially a refractive index step boundary between the at least one channel waveguide and the top cladding layer.

11. The polymer-based waveguide device as described in claim 1, wherein a refractive index of the polymer-based waveguide device gradually decreases from within the at least one channel waveguide outwardly through the bottom cladding layer, and gradually decreases from within the at least one channel waveguide outwardly through the top cladding layer.

12. A polymer-based waveguide device for use in an optical amplifier or as a laser waveguide, the polymer-based waveguide device comprising:
   a substrate;
   a polymer bottom cladding layer arranged on the substrate;
   a polymer top cladding layer applied onto said bottom cladding layer; and
   at least one polymer channel waveguide doped with rare earth metal ions that can be excited to produce a laser, and embedded between said polymer bottom cladding layer and said polymer top cladding layer, the rare earth metal ions being combined with an organic compound to form complexes which have relatively high solubility in a polymer.

13. The polymer-based waveguide device as described in claim 12, wherein said polymer channel waveguide extends through the device along a lengthwise direction to reach an exterior while being surrounded by said polymer bottom cladding layer and said polymer top cladding layer in lateral directions perpendicular to said lengthwise direction.

14. A polymer-based waveguide device for use in an optical amplifier or as a laser waveguide, the polymer-based waveguide device comprising:

a substrate;

a polymer bottom cladding layer arranged on the substrate;

at least one polymer channel waveguide doped with rare earth metal ions that can be excited to produce a laser, the at least one channel waveguide being arranged on the bottom cladding layer, the rare earth metal ions being combined with an organic compound to form complexes, the organic compound having a polydentate cage structure enclosing the rare earth metal ions; and a polymer top cladding layer arranged on the at least one channel waveguide.

15. The polymer-based waveguide device as described in claim 14, wherein the substrate is made of a material selected from a group comprising silicon single crystal, silicon polycrystal, lithium niobate single crystal, quartz, optical glass and optical plastic.

16. The polymer-based waveguide device as described in claim 14, wherein the rare earth metal ions are one or more of the group comprising erbium, thulium, holmium, praseodymium, samarium, cerium, ytterbium, neodymium, europium and gadolinium.

17. The polymer-based waveguide device as described in claim 14, wherein the bottom and top cladding layers are made of the same polymer.

18. The polymer-based waveguide device as described in claim 14, wherein a refractive index of the bottom cladding layer is substantially lower than a refractive index of the at least one channel waveguide, and a refractive index of the top cladding layer is substantially lower than the refractive index of the at least one channel waveguide.

19. The polymer-based waveguide device as described in claim 14, wherein the refractive index of the bottom cladding layer is substantially equal to the refractive index of the top cladding layer.

20. The polymer-based waveguide device as described in claim 14, wherein the at least one channel waveguide is substantially parallel to the substrate.

* * * * *